United States Patent
Balachandran et al.

(10) Patent No.: US 9,065,606 B2
(45) Date of Patent: *Jun. 23, 2015

(54) ARCHITECTURE TO SUPPORT NETWORK-WIDE MULTIPLE-IN-MULTIPLE-OUT WIRELESS COMMUNICATION OVER A DOWNLINK

(71) Applicant: Alcatel Lucent, Boulogne-Billancourt (FR)

(72) Inventors: Krishna Balachandran, Murray Hill, NJ (US); Srinivas R. Kadaba, Murray Hill, NJ (US); Kemal M. Karakayali, Murray Hill, NJ (US); Ashok Rudrapatna, Basking Ridge, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 0 days.

This patent is subject to a terminal disclaimer.

(21) Appl. No.: 14/293,606

(22) Filed: Jun. 2, 2014

(65) Prior Publication Data

US 2014/0269640 A1    Sep. 18, 2014

Related U.S. Application Data

(63) Continuation of application No. 12/233,253, filed on Sep. 18, 2008, now Pat. No. 8,787,302.

(51) Int. Cl.
*H04B 7/04* (2006.01)
*H04L 5/00* (2006.01)
*H04W 56/00* (2009.01)
*H04B 7/02* (2006.01)

(52) U.S. Cl.
CPC .............. *H04L 5/0035* (2013.01); *H04B 7/024* (2013.01); *H04B 7/0413* (2013.01); *H04L 5/0082* (2013.01); *H04W 56/0015* (2013.01)

(58) Field of Classification Search
None
See application file for complete search history.

(56) References Cited

U.S. PATENT DOCUMENTS

| | | | |
|---|---|---|---|
| 6,925,068 B1* | 8/2005 | Stanwood et al. | 370/329 |
| 7,155,263 B1* | 12/2006 | Bergamo | 455/574 |
| 2006/0239266 A1* | 10/2006 | Babbar et al. | 370/392 |
| 2007/0248172 A1* | 10/2007 | Mehta et al. | 375/260 |
| 2008/0056184 A1* | 3/2008 | Green | 370/329 |
| 2010/0027456 A1* | 2/2010 | Onggosanusi et al. | 370/312 |
| 2010/0067604 A1* | 3/2010 | Bhadra et al. | 375/267 |
| 2010/0278136 A1* | 11/2010 | Oyman et al. | 370/330 |

OTHER PUBLICATIONS

Motorola, "LTE-A Multiple Point Coordination and its Classification"; TSG-RAN WG1 #54; Aug. 18-22, 2008; pp. 1-6; R1-083229; 3GPP, Jeju, South Korea.*

* cited by examiner

*Primary Examiner* — Ayaz Sheikh
*Assistant Examiner* — Tarell Hampton
(74) *Attorney, Agent, or Firm* — Davidson Sheehan LLP

(57) ABSTRACT

The present invention provides a method of coordinating the downlink transmissions from a plurality of base stations to at least one mobile unit. The method is implemented in a control plane entity and includes receiving, at the control plane entity and from each of the plurality of base stations, channel state information for a plurality of wireless communication channels between the plurality of base stations and one or more mobile units. The method also includes determining, at the control plane entity and based on the channel state information, transmission formats for downlink transmissions from the plurality of base stations to the mobile unit(s). The method further includes providing the transmission formats to the plurality of base stations.

20 Claims, 2 Drawing Sheets

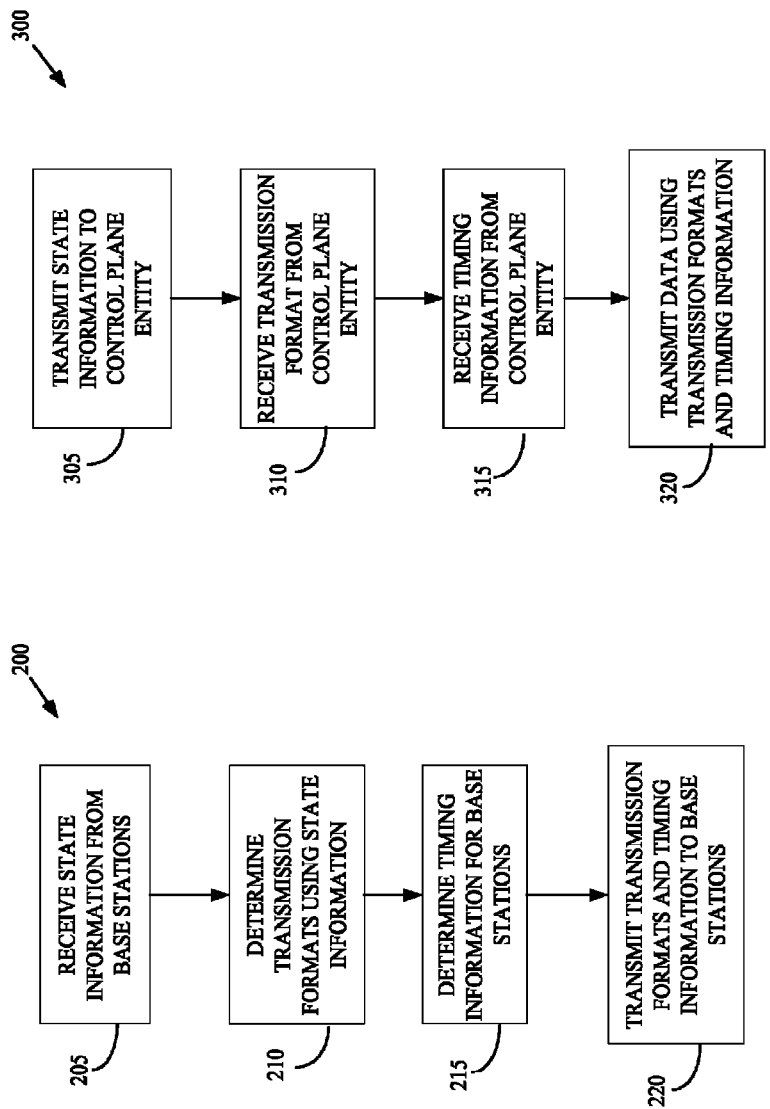

ARCHITECTURE TO SUPPORT NETWORK-WIDE MULTIPLE-IN-MULTIPLE-OUT WIRELESS COMMUNICATION OVER A DOWNLINK

CROSS REFERENCE TO RELATED APPLICATIONS

This application is a continuation of co-pending U.S. patent application Ser. No. 12/233,253, filed on Sep. 18, 2008, which is entitled, "AN ARCHITECTURE TO SUPPORT NETWORK-WIDE MULTIPLE-IN-MULTIPLE-OUT WIRELESS COMMUNICATION OVER AN UPLINK" This application is related to U.S. patent application Ser. No. 11/778,282, filed on Jul. 16, 2007, entitled "AN ARCHITECTURE TO SUPPORT NETWORK-WIDE MULTIPLE-IN MULTIPLE-OUT WIRELESS COMMUNICATION and U.S. patent application Ser. No. 12/233,253, filed on Sep. 18, 2008, entitled "AN ARCHITECTURE TO SUPPORT NETWORK-WIDE MULTIPLE-IN-MULTIPLE-OUT WIRELESS COMMUNICATION OVER AN UPLINK

BACKGROUND OF THE INVENTION

1. Field of the Invention

This invention relates generally to communication systems, and, more particularly, to wireless communication systems.

2. Description of the Related Art

Base stations in wireless communication systems provide wireless connectivity to users within a geographic area, or cell, associated with the base station. In some cases, the cell may be divided into sectors that subtend a selected opening angle (e.g., three 120° sectors or six 60° sectors) and are served by different antennas. The wireless communication links between the base station and each of the users typically includes one or more downlink (DL) (or forward) channels for transmitting information from the base station to the mobile unit and one or more uplink (UL) (or reverse) channels for transmitting information from the mobile unit to the base station. Multiple-input-multiple-output (MIMO) techniques may be employed when the base station and, optionally, the user terminals include multiple antennas. For example, a base station that includes multiple antennas can concurrently transmit multiple independent and distinct signals on the same frequency band to same user or multiple users in a cell/sector. MIMO techniques are capable of increasing the spectral efficiency of the wireless communication system roughly in proportion to the number of antennas available at the base station.

Conventional MIMO techniques coordinate operation of multiple antennas that are co-located with the coordinating base station. For example, the multiple antennas associated with a base station (BS) are typically configured so that the antennas are less than about 10 m from the base station. The signals transmitted from the base station to the antennas and then over the air interface to the mobile station (MS) on DL may be phase aligned so that they can be coherently combined at the receiver, e.g., the mobile station. Constructive and/or destructive interference of coherent radiation from the multiple antennas can therefore be used to amplify the signal in selected directions and/or null the signal in other directions. Processing of the coherent signals may also be used to minimize the mutual interference between multiple transmitters. Similarly on UL, signals received from multiple antennas can be combined to maximize signal strength, maximize SINR, detect multiple signals simultaneously through well-known algorithms such as MRC (maximum ratio combining), MMSE (minimum mean squared error), and MLSE (maximum likelihood sequence estimator). However, conventional MIMO does not address the inter-cell interference caused by uplink and/or downlink transmissions in neighboring cells.

A new class of multi-antenna techniques called Inter-Base Station MIMO (IBS-MIMO) has been proposed to enhance air-interface performance by enabling concurrent transmission of superposed signal waveforms from antennas at different base stations to one or more mobile terminals in such a way that the resulting mutual interference is suppressed. On the downlink, different BSs concurrently transmit (in a coordinated fashion) superposed signal waveforms from their antennas to one or more MSs in such a way that the resulting mutual interference is suppressed and the signals from multiple BSs may be coherently combined at each MS. In this process, the signal destined for a specific MS can be transmitted from different BSs. The radio access network provides control signaling and/or data plane exchanges to coordinate the BSs so that their transmissions can be coherently combined.

Coordination can be accomplished in different ways to create a range of IBS MIMO techniques. For example, coordination with the goal of achieving coherent reception at the MS for transmissions by a plurality of base stations while suppressing interference caused by transmissions to other MSs served by the same or different plurality of base stations is called "Network MIMO". Network MIMO requires coordination across BSs at short time scales (e.g. on the order of a few ms to tens of ms). The actual time scales can be determined based on the maximum mobile terminal velocity expected to be supported. On the other hand, coordination to achieve non-coherent combining at the MS is called "Collaborative MIMO" and can be performed at longer time scales on the order of 100s of ms. Similar architectures can be used to support Network MIMO and Collaborative MIMO even though the two approaches impose different delay and bandwidth requirements on the network that connects the BSs.

Implementation of IBS-MIMO techniques is strongly constrained by existing network architectures and expected future developments in network architectures. Many network architectures support control plane operations and bearer plane operations. For example, base stations can be configured to handle bearer plane operations such as physical layer and medium access control layer operations. In some cases, the bearer (or data) plane can be separated into two levels: an upper level implemented in an IP gateway router and a lower level implemented in an IP-capable base station. Control plane operations such as scheduling and resource allocation may also be implemented in the base station. IBS-MIMO techniques should be implemented in a manner that is, to the greatest degree possible, consistent with these architectural constraints to minimize disruptions caused by implementation of these techniques.

SUMMARY

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for coordinating the downlink transmissions from a plurality of base stations to at least one mobile unit. The method is implemented in a control plane entity and includes receiving, at the control plane entity and from each of the plurality of base stations, channel state information for a plurality of wireless communication channels between the plurality of base stations and one or more mobile units. The method also includes determining, at the control plane entity and based on the channel state information, transmission formats for downlink transmissions from the plurality of base stations to the mobile unit(s). The method further includes providing the transmission formats to the plurality of base stations.

In other embodiments, a method is provided for coordinated downlink transmission from a plurality of base stations to at least one mobile unit. The method is implemented in a first base station that is one of the plurality of base stations. The method includes providing, to a control plane entity and from the first base station, channel state information for wireless communication channels between at least one antenna associated with the first base station and at least one antenna associated with the mobile unit(s). The method also includes receiving, from the control plane entity and at the first base station, transmission formats for downlink transmissions from the first base station to the mobile unit(s). The transmission formats are determined by the control plane entity for the plurality of base stations based on the channel state information transmitted to the control plane entity and additional channel state information provided to the control plane entity by at least one second base station from the plurality of base stations. The method further includes transmitting data over the downlink in coordination with the plurality of base stations using the received transmission formats.

BRIEF DESCRIPTION OF THE DRAWINGS

The disclosed subject matter may be understood by reference to the following description taken in conjunction with the accompanying drawings, in which like reference numerals identify like elements, and in which:

FIG. 2 conceptually illustrates one exemplary embodiment of a method of operating a control plane entity in the wireless communication system shown in FIG. 1; and FIG. 3 conceptually illustrates one exemplary embodiment of a method of operating a bearer plane entity and the wireless communication system shown in FIG. 1.

Figure 1:
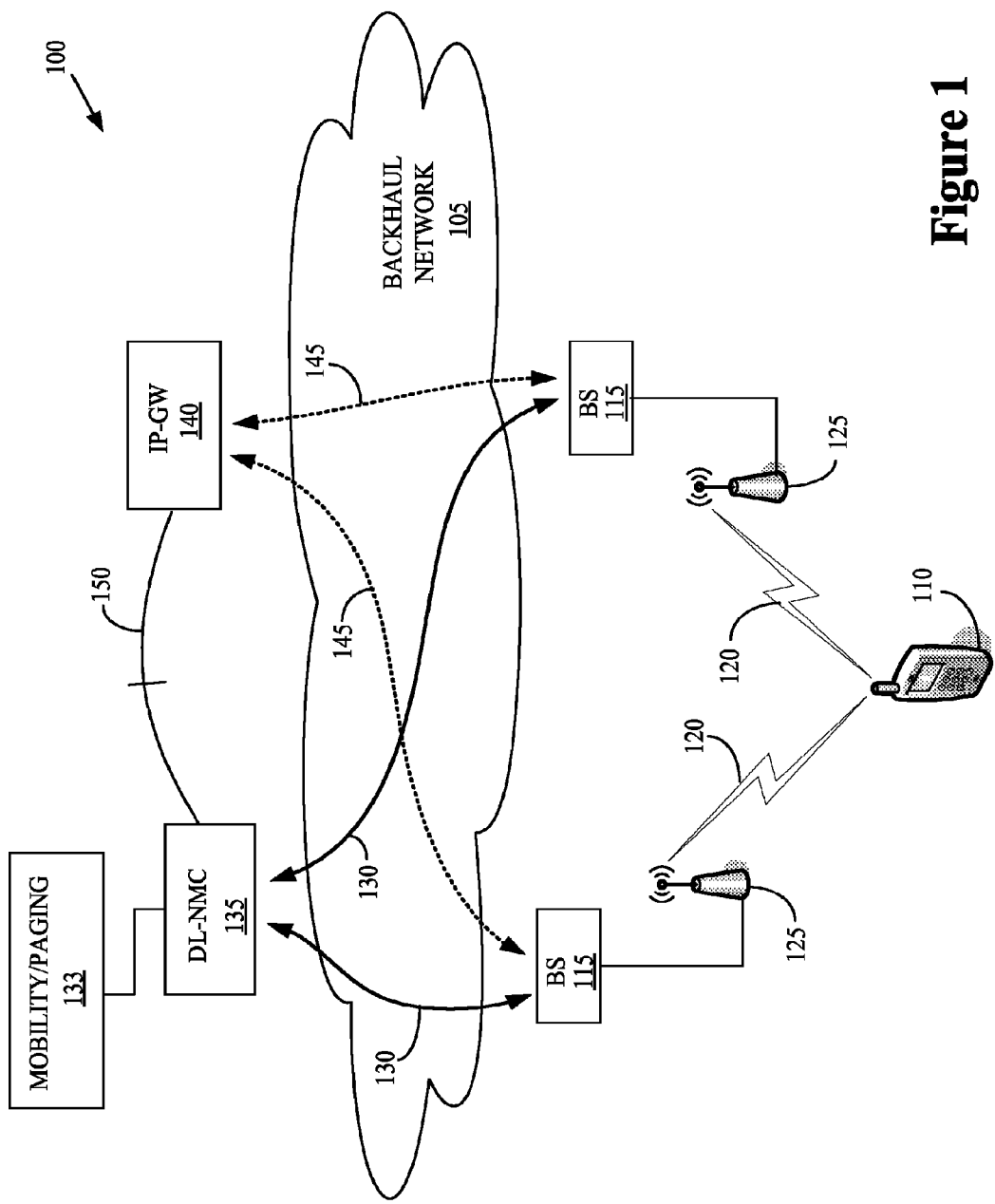
FIG. 1 conceptually illustrates one exemplary embodiment of a wireless communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the illustrated embodiment, the wireless communication system 100 includes a backhaul network 105 that may be used to transmit information among the various elements of the wireless communication system 100. As used herein and in accordance with common usage in the art, the "backhaul network" refers to the transport network that carries wireless network related data and control between base stations and control entities such as radio network controllers. The backhaul network 105 may operate according to any combination of wired and/or wireless communication standards and/or protocols. Exemplary standards and/or protocols that can be used to implement the backhaul network 105 include Frame Relay, ATM, Ethernet, and the like, as well as higher layer protocols such as ATM, IP, and the like. Techniques for accessing the backhaul network 105 and/or communicating information through the network 105 are known in the art and in the interest of clarity only those aspects of these techniques that are relevant to the present techniques will be discussed herein.

The wireless communication system 100 is used to provide wireless connectivity to one or more mobile units 110 (only one shown in FIG. 1) so that they may access the network 105. Exemplary mobile units 110 may include cellular telephones, personal data assistants, smart phones, pagers, text messaging devices, Global Positioning System (GPS) devices, network interface cards, notebook computers, desktop computers, and the like. In various alternative embodiments, the mobile units 110 may include a single antenna or a plurality of antennas for communicating with the wireless communication system 100.

In the illustrated embodiment, the wireless communication system 100 includes a plurality of base stations (BS) 115 that are used to provide wireless connectivity to the mobile units 110. Each base station 115 is configured to receive downlink information and convert this information into a format that can be transmitted to the mobile unit 110 over air interfaces 120. The base stations 115 are configured to perform physical (PHY) layer processing and medium access control (MAC)

layer functions. Since the physical and/or medium access control layer functionality is used to support radio bearers associated with the air interfaces 120, the functionality implemented in the base stations 115 is typically referred to as "bearer plane" functionality. To implement bearer plane functions, the base stations 115 use transmission formats, transmission times, and packets provided by control plane entities, as discussed herein. Techniques for implementing bearer plane functionality such as physical and/or medium access control layer functionality in the base stations 115 are known in the art and in the interest of clarity only those techniques that are relevant to the present invention will be discussed herein. Each the station 115 is communicatively coupled to one or more antennas 125 that may be used to transmit and receive modulated radio frequency signals over the air interfaces 120.

The base stations 115 are also capable of gathering state information associated with communication between the base stations 115 and the mobile unit 110. One type of state information is wireless channel state information that indicates the current state of the wireless communication channel(s) supported by the air interfaces 120. The base station 115 can determine the wireless channel state information using known techniques such as measurements of pilot signal gain and phase, signal-to-interference-plus-noise ratios, C/I ratios, and the like. These types of downlink channel state information may be measured by mobile stations (MSs) from each transmit antenna to each receive antenna and feedback to the BS via uplink, or measured directly at the BS based on uplink signals and used as is in time division duplex (TDD) or translated to down link quantities based on appropriate signal processing. Another type of state information is queue state information that indicates the current state of queues or buffers maintained by the base stations 115 for storing data before this data is transmitted over the downlink to the mobile units 110. For example, queue state information may indicate current buffer occupancy, an overflow condition, an underflow condition, and the like. The state information can be transmitted from the base stations 115 to various control plane entities over a backhaul links 130. The base stations 115 are also configured to receive control signaling over the backhaul links 130.

The control plane entities in the wireless communication system 100 include a mobility management and paging element 133. The mobility management and paging control element 133 may be logical or physical, as in the following examples. In 1xEV-DO and UMTS-HSPA, a physical network element called the Radio Network Controller (RNC) serves the control functions as well as bearer plane functions that span the IP layer and Layer 2. The RNC is located between the IP gateway and the base stations 115. In WiMAX Profile C, a physical network element called the Access Service Node Gateway (ASN-GW) co-locates the control functions with bearer plane IP gateway functions. The ASN-GW connects with the base stations 115, which serve all the Layer 1 (physical layer) and most Layer 2 bearer plane functions. LTE-SAE and UMB are similar to WiMAX Profile C in distributing bearer plane functions at layers 1-3. However, control functions may be located on a separate control element called the Signaling RNC or Mobility Management Entity (MME), with specified interfaces to the IP gateway as well as the base stations 115. By virtue of managing key functions such as mobility and paging, the mobility management and paging element 133 is aware of the location of each mobile unit 110 in the network as well as the "legs" associated with the mobile units 110, i.e. the usable wireless connectivity to different base stations 115.

The wireless communication system 100 also includes a control plane entity 135 that is used to support concurrent transmission of superposed signal waveforms from the antennas 125 so that the superposed signal waveforms combine coherently at the mobile unit 110. Coordinating transmission of the signal waveforms in this manner can reduce or suppress the mutual interference between the signal waveforms. In the illustrated embodiment, this control plane entity is referred to as a downlink network multiple-input-multiple-output (MIMO) controller (DL-NMC) 135. In one embodiment, the downlink network MIMO controller 135 may be co-located with the mobility management and paging element 133. In another embodiment, the downlink network MIMO controller 135 may be co-located with one or more base stations 115. In yet another embodiment, the downlink network MIMO controller 135 may be one or more separate physical network nodes dedicated to NMC functionality. Thus, the downlink network MIMO controller 135 may be implemented as either a centralized entity or as distributed functionality.

In the illustrated embodiment, the base stations 115 provide the collected state information to the downlink network MIMO controller 135, which then generates control signaling that is provided to the base stations 115 to coordinate downlink communication with the mobile unit 110. For example, the network MIMO controller 135 can use the wireless channel state information and/or queue state information to compute transmission formats to be used for transmitting downlink information from each base station 115 to the mobile units 110. The computed transmission formats can then be communicated to the base stations 115 over the backhaul links 130. The transmission format may include parameters such as information block size, error control codes, code rates, modulation orders, antenna beamforming weights, transmit power, orthogonal frequency division multiplexing (OFDM) tones or tiles, and the like. In many cases, the control plane operations performed by the downlink network MIMO controller 135 only use information about the channel states and (optionally) the states of the mobile-specific queues maintained at the base stations 115. Consequently, the downlink network MIMO controller 135 does not necessarily have to have access to the actual packet contents of the downlink transmission queues.

The downlink network MIMO controller 135 may also participate in selecting the base stations 115 that are part of the downlink coordination cluster for each mobile unit 110. In one embodiment, the downlink network MIMO controller 135 determines membership in coordination clusters for each mobile unit 110 based on information provided by the various base stations 115. Membership may be predetermined and/or dynamically determined by the downlink network MIMO controller 135. Alternatively, cluster membership may be determined by other entities in the network 100 such as the base stations 115. Once membership in the coordination clusters has been determined, communication channels over the backhaul links 130 may be set up so that the state information can be transmitted from the base stations 115 to the downlink network MIMO controller 135 and control information can be transmitted back to the base stations 115.

In one embodiment, the coordination cluster associated with each mobile unit 110 may be initially determined when the mobile unit 110 first accesses the network 100. For example, the downlink network MIMO controller 135 (and/or other entities in the network 100) may determine whether a particular mobile unit 110 can benefit from application of network MIMO techniques. If the mobile unit 110 is handled using network MIMO, the downlink network MIMO controller 135 can select the coordination cluster for the mobile unit 110. In some cases, the mobile unit 110 may be handled by a single base station 115 instead of being associated with a coordination cluster. The downlink network MIMO controller 135 may also periodically update the status of the mobile unit 110. Updating may include modifying base station membership in the coordination cluster associated with the mobile unit 110, changing the status of the mobile unit 110 to apply network MIMO techniques, changing the status of the mobile unit 110 to deactivate application of network MIMO techniques, and the like.

The wireless communication system 100 may include multiple coordination clusters that are controlled by different downlink network MIMO controllers 135. In one embodiment, each cluster consists of one or more downlink network MIMO controllers 135 and a set of base stations 115 that are contiguous in spatial coverage. The geographically neighboring clusters may not overlap unless different sets of frequencies or time intervals are assigned to different clusters. This separation may prevent race conditions between downlink network MIMO controllers 135 that attempt to control the same base station 115 in the event of overlap. If there is separation in terms of frequency sets or time interval assignments (even with spatial overlap), such race conditions would be avoided. In fact, a base station 115 that is capable of supporting multiple frequency sets or time interval sets behaves like multiple base stations 115 and can simultaneously be coordinated by multiple downlink network MIMO controllers 135, each of which controls base stations 115 with a given frequency or time interval. Indeed, with base stations 115 supporting multiple frequencies or time intervals, spatial overlap may prove to be highly advantageous because a mobile unit 110 within the interior of multiple clusters may get multiple IBS-MIMO benefits, from each of these clusters concurrently.

The wireless communication system 100 also includes an Internet protocol gateway (IP-GW) 140. The IP gateway 140 is predominantly a bearer plane device that is configured to perform IP layer functions such as providing downlink packets to the base stations 115 over the backhaul links 145. However, in some embodiments, the IP gateway 140 may serve control plane functions in some deployed standards such as EV-DO and HSPA. The IP gateway 140 and the downlink network MIMO controller 135 may communicate over an interface 150. For example, the downlink network MIMO controller 135 may use the interface 150 to inform the IP gateway 140 of the cluster membership for each mobile unit 115. The IP gateway 140 may then use this information to ensure that the appropriate base stations 115 are expecting to receive packets destined for the mobile unit 110. Duplicate packet flows may then be transmitted to the base stations 115 that are in the coordination cluster associated with the mobile unit 110. The base stations 115 may store the received data packets in one or more buffers or queues. In one embodiment, the mobility management and paging element 133 may be co-located with the IP gateway 140 (as in WiMAX). Alternatively, the mobility management and paging element 133 may be implemented so that it is physically separate from the IP gateway 140 (as in SAE and UMB).

Signals transmitted over the air interfaces 120 should be tightly synchronized to facilitate the coherent combining of the signals that are transmitted by the antennas 125. In one embodiment, the downlink network MIMO controller 135 determines timing information for the base stations 115 and the base stations 115 can use this timing information to coordinate transmission of signals over the air interface 120. For example, the timing information may indicate an instant at which selected information should be transmitted over the air interfaces 120. The base stations 115 may use knowledge of the relative time delays between different branches of the backhaul links from the base stations 115 to the antennas 125 to determine when to send signals to the antennas 125. When the base stations 115, the antennas 125, and the backhaul links are configured so that the relative time delays associated with the different backhaul links are known and fixed, the base stations 115 may determine the relative time delays based on the configuration information. However, the stringent timing constraints imposed by requiring coherency of the signals transmitted and/or received by the antennas 125 are likely to require dynamic determination of the relative time delays. In one embodiment, the base stations 115 may dynamically determine the relative time delays between the legs of the backhaul links by transmitting a timing signal to the antennas 125, receiving an echo back from the antennas 125, and determining the both the round-trip delay and one way delays between the base stations 115 and antennas 125 based upon a response signal transmitted by the antennas 125 when they receive the timing signal. The timing signals may be transmitted periodically, in response to initiation of a communication session with a mobile unit 110, and/or at any other time.

The downlink network MIMO controller 135 may also provide the timing information to the IP gateway 140 over the interface 150. In one embodiment, the IP gateway 140 may use this information to schedule packet transmissions to the appropriate base stations 115 over the backhaul links 145. In this way, the IP gateway 140 can ensure that packets scheduled for downlink transmission to the mobile units 110 are available at the base stations 115 before they are needed for physical layer processing and eventual transmission over the air interface 120.

The downlink network MIMO controller 135 may be configured to schedule transmissions over the air interfaces 120. For example, the downlink network MIMO controller 135 may schedule the mobile units 110 that should receive data during various downlink transmission time intervals. In one embodiment, the downlink network MIMO controller 135 can jointly select the mobile units 110 and compute the transmit formats that are used to transmit information to the selected mobile units 110. However, in alternative embodiments, the scheduling of the mobile units 110 may be performed by the base stations 115, which then inform the downlink network MIMO controller 135 of the selected mobile units 110. The downlink network MIMO controller 135 may then compute transmit formats and allocates resources for the scheduled downlink transmissions. The scheduling function could also be distributed between the base stations 115 and the downlink network MIMO controller 135 so that some mobile units 110 may be scheduled by the base stations 115 and the remaining mobile units 110 can be scheduled by the downlink network MIMO controller 135.

Although FIG. 1 shows a single downlink network MIMO controller 135, persons of ordinary skill in the art having benefit of the present disclosure should appreciate that in practice the wireless communication system 100 may include multiple downlink network MIMO controllers 135, each with its zone of control. The downlink network MIMO controller 135 zones may be demarcated spatially to cover a number of base stations 115 (such as a city or a suburb) or in other terms such as carrier or tone frequencies or time intervals used. Depending on preferences in deployment and/or resource management, these zones may overlap as appropriate. Further, as mobile units 110 move through the network, the downlink network MIMO controllers 135 may have to communicate with each other to exchange information about these roaming mobile units 110.

FIG. 2 conceptually illustrates one exemplary embodiment of a method 200 of operating a control plane entity in the wireless communication system shown in FIG. 1. One example of a control plane entity includes the downlink network MIMO controller 135 depicted in FIG. 1. However, persons of ordinary skill in the art having benefit of the present disclosure should appreciate that other embodiments of the method 200 may be implemented in one or more other control plane entities. In the illustrated embodiment, the control plane entity receives (at 205) state information from bearer plane entities such as base stations. The state information may include wireless communication channel state information and/or queue state information associated with queues in the base stations.

The control plane entity then determines (at 210) transmission formats that can be used by base stations to transmit information over a downlink to one or more mobile units. The transmission formats include, but are not limited to modulation and coding, transmit power, antenna weights, resource blocks (time, frequency, spreading codes and the like), etc. The transmission formats are determined using the state information provided by the bearer plane entities and are selected (at 210) so that base stations can transmit downlink information in a coordinated manner to reduce or suppress mutual interference between signals transmitted by the different base stations. In one embodiment, the control plane entity also determines (at 215) individual timing information that is used by the base stations and/or their subtending antennas to coordinate transmissions. The transmission formats and (if available) the timing information are then transmitted (at 220) to the base stations over one or more backhaul links.

FIG. 3 conceptually illustrates one exemplary embodiment of a method 300 of operating a bearer plane entity and the wireless communication system shown in FIG. 1. In the illustrated embodiment, the bearer plane entity is a base station such as the base stations 115 shown in FIG. 1. However, persons of ordinary skill in the art having benefit of the present disclosure should appreciate that other bearer plane entities may be used in other embodiments. The bearer plane entity collects state information, such as channel state information and/or queue state information, and transmits (at 305) the state information to a control plane entity. The bearer plane entity then receives (at 310) transmission formats for transmitting information to one or more mobile units. The bearer plane entity may also receive (at 315) timing information from the control plane entity. The bearer plane entity then transmits (at 320) data over the air interface using the transmission formats and/or timing information provided by the control plane entity.

Referring back to FIG. 1, the downlink network MIMO controller 135 may be implemented as a centralized entity or as functionality that is distributed throughout multiple elements (e.g., the base stations 115) within the communication system 100. Embodiments of the communication system 100 that support centralized and distributed embodiments may utilize different procedures, interfaces, protocols, and/or messages.

A centralized downlink network MIMO controller 135 may use interfaces between the base stations 115 and the downlink network MIMO controller 135, the base stations 115 and the bearer plane gateway 140, and the downlink network MIMO controller 135 and the bearer plane gateway 140. Furthermore, protocols can be established for carrying different types of IBS-MIMO related messages over the interfaces. In some cases, basic interfaces/messages defined by existing standards can be extended and/or modified for IBS-MIMO purposes as discussed herein.

For example, the interface between the base stations 115 and the control plane element is known as S1c in LTE/SAE and U2 in UMB. Since WiMAX Profile C co-locates the control element with the gateway, it does not specify such a separate interface for the control plane. Persons of ordinary skill in the art should appreciate that known protocols are available to form messages to carry information about the locations of mobile units, active legs, and other information. In one embodiment, the known protocols could be reused by modifying the known protocols to include new IBS-MIMO related messages. For example, the known protocols could be modified by adding messages that can be used to carry the channel state information and scheduling parameters from the base stations 115 to the control element 135. The known protocols could also be modified to include messages for transmitting schedule grant and transmission formats information from the control element 135 to the base stations 115.

Examples of an interface between the base stations 115 and the gateway 140 include the S1u in LTE/SAE, U1 in UMB, and R6 in WiMAX. Note that R6 also carries control information in WiMAX. In some embodiments, these known interfaces and protocols can be modified to include messages to carry data packets between the base stations 115 and gateway 140. In some cases, existing messages can be used to carry the new information so that new messages may not be necessary since no preprocessing of the data packets is performed at the gateway 140. However, in these cases, a new function may be implemented so that the gateway 140 can distribute data packets destined for the mobile station 110 to each of the base stations 115 that form a leg with the mobile station 110.

Examples of interfaces between the gateway 140 and the control element 135 may include the S11 in LTE/SAE and U6 in UMB. Since these are co-located in the ASN-GW in WiMAX Profile C, such an interface is internal to the ASN-GW. In some embodiments, these known interfaces and protocols can be modified to include messages to instruct the gateway 140 about the legs of each mobile terminal 110, so that the gateway 140 can distribute data packets appropriately. New messages may be defined for this purpose.

In operation, the centralized downlink network MIMO controller 135 may initially transmit the locations of various mobile terminals 110 and their corresponding legs to the appropriate base stations 115. The core control element 133/135 that manages mobility and paging is aware of the location of each mobile terminal 110, as well as all its legs (i.e., radio links to base stations 115 that satisfy certain pre-determined criteria such as link quality over a certain threshold). Thus, the core control element 133/135 can inform each base station 115 of all the mobile terminals 110 that have a leg at the base station 115 so that the mobile terminal 110 can communicate with the base station 115. One distinction between the IBS-MIMO techniques described herein and soft handoff is that it is possible that different measurement thresholds for soft handoff and IBS-MIMO may result in the number of legs for handoff being different than the number of legs that may be used for IBS-MIMO. In this scenario, the mobility manager may be enhanced to maintain a separate record for IBS-MIMO legs and soft handoff legs and inform the base stations 115 appropriately.

The centralized downlink network MIMO controller 135 may also control the bearer packet distribution within the wireless communication system 100. In one embodiment, the control element 135 informs the bearer plane gateway 140 (which may be implemented in the RNC in 1xEV-DO and HSPA, IP-GW in LTE/SAE and UMB, and ASN-GW in WiMAX) of the associations between the mobile terminals 110 and the base stations 115. For each mobile unit 110, the gateway 140 can then pre-distribute packets to all the associated base stations 115. Typically, these associations do not change quickly; therefore, pre-distributing packets may ensure that the base stations 115 can transmit to the mobile units 110 as soon as the scheduling and transmission formats information is made available. However, it is also possible for the control entity 135 to inform the gateway 140 of the scheduled mobile units 110 so that the gateway 140 can in turn distribute packets to the respective base stations 115.

The base stations 115 may then gather or collect channel state information (CSI) associated with the supported legs. In one embodiment, each base station 115 obtains per-antenna CSI parameters—such as channel gain and phase—to each mobile unit antenna with which it has a leg. The CSI can be measured directly by the base station 115 (as in the case of Time Division Duplex (TDD) operation) or alternatively the CSI may be reported to the base station 115 by the mobile units 110 in the case of Frequency Division Duplex (FDD) operation. Yet another alternative is that the CSI may be estimated by a separate element such as an Uplink IBS-MIMO Processor. The base stations 150 may also collect other scheduling parameters including queue depth, traffic type and QoS parameters, and the like. The collected information may then be transmitted to the centralized downlink MIMO network controller 135. In one embodiment, the quantum of information conveyed may be optimized based on the number of mobile units 110 deemed to benefit from IBS-MIMO. This is closely related to the process of scheduling and transmission format computation, described below.

Scheduling of the transmissions and/or the transmission format computations may be accomplished using a variety of options. A first option is to transmit all of the channel state information and other scheduling information from the base stations 115 to the centralized downlink network MIMO controller 135, which then schedules the mobile units 110 and computes the corresponding transmission formats. The transmission formats and the scheduling information are then conveyed to the base stations 115 for subsequent transmissions, as described herein. A second option is to distribute the computations between the base stations in the centralized downlink network MIMO controller 135. In this case, the scheduling parameters and channel state information for a selected subset of the mobile units 110 is transmitted to the centralized downlink network MIMO controller 135, which then compute the transmission formats and does the scheduling for this subset of the mobile units 110. The base stations 115 then assume responsibility for scheduling other mobile units 110 and computing their respective transmission formats. A third option is to allow the base stations 115 to perform scheduling of the mobile units 110. The base stations 115 can then transmit the identities of the scheduled mobile units and the corresponding channel state information to the centralized downlink network MIMO controller 135, which computes the corresponding transmission formats and conveys this information to the base stations 115.

An alternative to the centralized structure is to use a decentralized, or distributed, downlink network MIMO controller 135. In the distributed architecture, the system 100 includes interfaces between the base stations 115 and the downlink network MIMO controller 135, the base stations 115 and the bearer plane gateway 140, and the downlink network MIMO controller 135 and the bearer plane gateway 140. The system 100 also defines additional interfaces between each of the base stations 115 because the distributed downlink network MIMO controllers 135 are co-located with the base stations 115. Furthermore, protocols can be established for carrying different types of IBS-MIMO related messages over the interfaces. In some cases, basic interfaces/messages are defined in existing standards and the standards can be extended and/or modified for IBS-MIMO purposes as discussed herein.

Examples of an additional interface between the base stations 115 include the X2 in LTE/SAE and R8 in WiMAX. Since IBSMCs 135 are located at the base stations 115 and the distributed architecture, this interface can be used to convey both control and data information across base stations 115 to enable IBS-MIMO. In some embodiments, the scope of this interface may be extended to include IBS-MIMO and new messages may be defined as well. For example, for each mobile unit 110, the base station 115 may use this interface to convey IBS-MIMO control information to the IBSMC 135, and the IBSMC 135 may use this interface to convey transmission formats to all the base stations 115 that are to transmit to the mobile unit 110.

In operation, the distributed architecture may operate in a manner that is similar to the algorithms used by the centralized architecture. However, operation of the distributed downlink network MIMO controller 135 may be modified to support the distribute architecture. For example, in the distributed scenario, the mobility manager may be enhanced to maintain a separate record for IBS-MIMO legs and inform the base stations 115 appropriately. The base station 115 with the "primary" leg to the mobile unit 110, i.e. the base station 115 with the strongest leg, can be designated as the distributed downlink network MIMO controller 135 for that mobile unit 110. In an alternate technique that may be less efficient, base stations 115 may inform immediate neighbors of the mobile units 110 that they have legs to, as well as the appropriate leg strengths. Subsequently, the base station 115 with the strongest leg can be designated as the distributed downlink network MIMO controller 135. Once the base stations 115 that support the distributed downlink network MIMO controller 135 for each of the mobile units 110 has been specified, operation of the distributed downlink network MIMO controller 135 may proceed as described herein.

Embodiments of the network architecture described herein adhere to the architectural principles of the major next generation standards being defined (e.g., LTE-SAE in 3GPP, UMB in 3GPP2, and WiMAX in the WiMAX Forum). Embodiments of the network architecture described herein may therefore enable network operators to harness the power of downlink Network MIMO without disruption to existing network architectures, even though Network MIMO can be a disruptive physical layer technology. Further, the network architecture described herein achieves this while controlling the additional backhaul bandwidth consumption due to network MIMO-related control information. In fact, this solution allows for selective application of Network MIMO technologies to only those users who are most likely to benefit from it, thus reducing the costs even further.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A physical plane entity to:
   receive channel state information for a plurality of wireless communication channels between a plurality of base stations and at least one mobile unit and queue state information indicative of a status of queues for data to be transmitted over the downlink to said at least one mobile unit by each of the plurality of base stations;
   determine, based on the channel state information and the queue state information, transmission formats for synchronized downlink transmissions from the plurality of base stations to said at least one mobile unit so that said synchronized downlink transmissions combine coherently and constructively at said at least one mobile unit; and
   provide the transmission formats to the plurality of base stations.

2. The physical control plane entity of claim 1, wherein the physical control plane entity is to determine at least one of a block size, an error control code, a code rate, a modulation order, an antenna beamforming weight, a transmit power, an orthogonal frequency division multiplexing tone, and an orthogonal frequency division multiplexing tile.

3. The physical control plane entity of claim 1, wherein the physical control plane entity is to determine timing information for each of the plurality of base stations based upon the channel state information.

4. The physical control plane entity of claim 3 wherein the physical control plane entity is to provide the timing information to the plurality of base stations, and wherein the plurality of base stations can transmit information over the downlink at times indicated by the provided timing information so that the transmitted information from the plurality of base stations combine coherently and constructively to amplify, at said at least one mobile unit, information transmitted over the downlink.

5. The physical control plane entity of claim 1, wherein the physical control plane entity is to schedule synchronized downlink transmissions from the plurality of base stations to said at least one mobile unit.

6. The physical control plane entity of claim 5, wherein the physical control plane entity is to jointly schedule the synchronized downlink transmissions and determine transmission formats for the synchronized downlink transmissions.

7. The physical control plane entity of claim 1, wherein the synchronized downlink transmissions from the plurality of base stations to said at least one mobile unit are scheduled by the corresponding base stations and the physical control plane entity is to determine transmission formats for the scheduled synchronized downlink transmissions.

8. The physical control plane entity of claim 1, wherein the physical control plane entity is to select the plurality of base stations that provide coordinated synchronized downlink transmission to said at least one mobile unit.

9. The physical control plane entity of claim 8, wherein the physical control plane entity is to provide, to an Internet Protocol (IP) gateway, information indicating the selected plurality of base stations so that the IP gateway can provide parallel downlink data streams to each of the selected plurality of base stations.

10. The physical control plane entity of claim 1, wherein the physical control plane entity is to dynamically determine relative time delays between legs of backhaul links between the physical control plane entity and antennas associated with the plurality of base stations, and wherein the physical control plane entity is to determine the transmission formats based on the relative time delays.

11. A base station for use as one of a plurality of base stations, wherein the base station is to:
   provide, to a control plane entity, channel state information for at least one wireless communication channel between at least one antenna associated with the base station and at least one antenna associated with said at least one mobile unit and queue state information indicative of a status of queues for data to be transmitted over the downlink to said at least one mobile unit;
   receive, from the control plane entity, transmission formats for synchronized downlink transmissions from the base station to said at least one mobile unit, the transmission formats being determined by the control plane entity for the plurality of base stations based on the channel state information and the queue state information transmitted to the control plane entity and additional channel state information and queue state information provided to the control plane entity by at least one other base station from the plurality of base stations; and
   transmit data over the downlink in coordination with the plurality of base stations using the received transmission formats so that synchronized downlink transmissions from the plurality of base stations combine coherently and constructively at said at least one mobile unit.

12. The base station of claim 11, wherein the base station is to receive at least one of a block size, an error control code, a code rate, a modulation order, an antenna beamforming weight, a transmit power, an orthogonal frequency division multiplexing tone, and an orthogonal frequency division multiplexing tile.

13. The base station of claim 11, wherein the base station is to receive timing information determined by the control plane entity based upon the channel state information.

14. The base station of claim 13, wherein the base station is to transmit information over the downlink at times indicated by the provided timing information so that the transmitted information combines coherently and constructively at said at least one mobile unit with information transmitted over the downlink by the plurality of base stations to amplify the information transmitted over the downlink by the first base station.

15. The base station of claim 11, wherein synchronized downlink transmissions from the base station to said at least one mobile unit are scheduled at the control plane entity, and wherein the base station is to receive, from the control plane entity, scheduling information for said synchronized downlink transmissions from the base station to said at least one mobile unit.

16. The base station of claim 11, wherein the base station is to schedule said at least one mobile unit for synchronized downlink transmissions and provide scheduling information to the control plane entity.

17. The base station of claim 16, wherein the base station is to receive transmission formats determined by the control plane entity for the scheduled synchronized downlink transmissions in response to providing the scheduling information to the control plane entity.

18. The base station of claim 11, wherein the base station is to receive information indicating that the control plane entity has selected the base station to provide coordinated synchronized downlink transmission to said at least one mobile unit.

19. The base station of claim 11, wherein the base station is to receive, from an Internet Protocol (IP) gateway and in response to being selected to provide coordinated synchronized downlink transmission, at least one downlink data stream concurrently with other downlink data streams provided to the plurality of base stations by the IP gateway.

20. A physical control pane entity to:
receive channel state information for a plurality of wireless communication channels between a plurality of base stations and at least one mobile unit;
dynamically determine relative time delays between legs of backhaul links between the physical control plane entity and antennas associated with the plurality of base stations by transmitting a timing signal from the physical control plane entity to the plurality of antennas and receiving echoes of the timing signal at the physical control plane entity from the plurality of antennas;
determine, based on the channel state information and the relative time delays, transmission formats for downlink transmissions from the plurality of base stations to said at least one mobile unit so that said downlink transmissions combine coherently and constructively at said at least one mobile unit; and
provide the transmission formats to the plurality of base stations.

* * * * *